United States Patent
Pettersson et al.

(10) Patent No.: US 10,713,607 B2
(45) Date of Patent: Jul. 14, 2020

(54) METHOD AND SYSTEM FOR A CONSTRUCTION SITE MANAGEMENT AND SUPPORT SYSTEM WITH A MARKING ROBOT

(71) Applicant: HEXAGON TECHNOLOGY CENTER GMBH, Heerbrugg (CH)

(72) Inventors: Bo Pettersson, Luxembourg (LU); Håkan Andersson, Karlskoga (SE); Jonas Wedin, Karlskoga (SE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 489 days.

(21) Appl. No.: 15/466,730

(22) Filed: Mar. 22, 2017

(65) Prior Publication Data
US 2017/0278030 A1    Sep. 28, 2017

(30) Foreign Application Priority Data
Mar. 22, 2016   (EP) .................................. 16161761

(51) Int. Cl.
*G06Q 10/00* (2012.01)
*G06Q 50/08* (2012.01)
(Continued)

(52) U.S. Cl.
CPC ..... *G06Q 10/0633* (2013.01); *G06K 19/0723* (2013.01); *G06Q 10/00* (2013.01); *G06Q 50/08* (2013.01)

(58) Field of Classification Search
CPC .............................. G06Q 10/00; G06Q 40/00
(Continued)

(56) References Cited

U.S. PATENT DOCUMENTS

| 5,755,072 A | 5/1998 | Lingafelter |
| 6,928,332 B2 | 8/2005 | Gass |

(Continued)

FOREIGN PATENT DOCUMENTS

| CN | 102226910 A | 10/2011 |
| CN | 202058039 U | 11/2011 |

(Continued)

OTHER PUBLICATIONS

Annie (Mark-up Barking Up the Wrong Tree), Computational Languistics, vol. 32, No. 4, pp. 577-580. (Year: 2006).*

(Continued)

*Primary Examiner* — Romain Jeanty
(74) *Attorney, Agent, or Firm* — Maschoff Brennan (57) ABSTRACT

The invention relates to an automated construction site management and support system for a preparation of a construction site during a construction rest period, and for determining a current state of a construction site during the rest period. The system comprises at least one server means, storing a general construction database with digital construction plan information, and a mobile support system being adapted for automatic movement and positioning on the construction site, and for executing auxiliary preparatory tasks for a construction work package such as tagging construction markings and information to the construction site, and for executing controlling tasks on the construction site for determining a current state of an object entity of a physical construction component. Sequences of auxiliary preparatory tasks or a set of controlling tasks are automatically defined based on the current state of the construction database, and, if applicable, a defined outcome for a work package.

14 Claims, 4 Drawing Sheets

(51) Int. Cl.
*G06Q 10/06* (2012.01)
*G06K 19/07* (2006.01)

(58) Field of Classification Search
USPC .......................................................... 705/7.27
See application file for complete search history.

(56) References Cited

U.S. PATENT DOCUMENTS

| | | | |
|---|---|---|---|
| 7,019,668 B2* | 3/2006 | Kinugawa | B60R 25/00 |
| | | | 180/287 |
| 7,269,569 B2* | 9/2007 | Spira | G06Q 10/04 |
| | | | 705/7.36 |
| 7,643,890 B1* | 1/2010 | Hillen | B23K 9/0953 |
| | | | 340/3.1 |
| 7,880,620 B2* | 2/2011 | Hatori | G06Q 10/06 |
| | | | 340/572.7 |
| 8,244,569 B2* | 8/2012 | Seppanen | G06Q 50/08 |
| | | | 705/7.23 |
| 8,467,968 B1 | 6/2013 | Dolinar et al. | |
| 8,543,603 B2* | 9/2013 | Boris | G06Q 10/10 |
| | | | 705/2 |
| 9,207,078 B2 | 12/2015 | Schorr et al. | |
| 9,244,494 B2* | 1/2016 | Hinson | G06F 15/025 |
| 9,406,039 B2* | 8/2016 | Reed | G06Q 10/06311 |
| 9,424,545 B1* | 8/2016 | Lee | G06Q 10/063114 |
| 2008/0179405 A1* | 7/2008 | Benderly | G06K 19/06046 |
| | | | 235/494 |
| 2008/0229313 A1* | 9/2008 | Motoyama | G06F 9/54 |
| | | | 718/102 |
| 2010/0235037 A1 | 9/2010 | Vian et al. | |
| 2012/0095926 A1 | 4/2012 | Nishimura et al. | |
| 2012/0130675 A1 | 5/2012 | Schorr et al. | |
| 2013/0096873 A1 | 4/2013 | Rosengaus et al. | |
| 2013/0185693 A1* | 7/2013 | Chaar | G06Q 10/06 |
| | | | 717/102 |
| 2014/0104419 A1 | 4/2014 | Metzler | |
| 2014/0192159 A1 | 7/2014 | Chen et al. | |
| 2014/0268064 A1 | 9/2014 | Kahle et al. | |
| 2014/0316837 A1 | 10/2014 | Fosburgh et al. | |
| 2015/0148949 A1 | 5/2015 | Chin et al. | |

FOREIGN PATENT DOCUMENTS

| | | |
|---|---|---|
| CN | 102280826 A | 12/2011 |
| CN | 102460329 A | 5/2012 |
| CN | 102968679 A | 3/2013 |
| CN | 103112008 A | 5/2013 |
| CN | 103886139 A | 6/2014 |
| EP | 1 116 080 B1 | 1/2005 |
| EP | 2 541 194 A1 | 1/2013 |
| EP | 2 629 210 A1 | 8/2013 |
| EP | 2 641 661 A1 | 9/2013 |
| EP | 2 638 358 B1 | 1/2015 |
| EP | 2 458 328 B1 | 1/2016 |
| EP | 2 799 150 B1 | 4/2016 |
| EP | 2 618 941 B1 | 6/2016 |
| GB | 2465072 A | 5/2010 |
| JP | H04-39709 A | 2/1992 |
| JP | H0565766 A | 3/1993 |
| JP | H08-1552 A | 1/1996 |
| JP | 2001-289638 A | 10/2001 |
| JP | 2007-118165 A | 5/2007 |
| JP | 5489310 B1 | 5/2014 |
| KR | 10-2010-0024572 A | 3/2010 |
| KR | 10-2014-0049676 A | 4/2014 |
| WO | 2007/135736 A1 | 11/2007 |
| WO | 2010/141180 A2 | 12/2010 |

OTHER PUBLICATIONS

Changyoon et al "Mobile computing platform for construction management) Department of Civil and Environmental Engineering", Dec. 2011, p. 1. (Year: 2012).*
Thomas et al "Construction Automation and Robotics", Oct. 2008, Intech, pp. 21-42 (Year: 2008).*
European Search Report dated May 3, 2016 as received in Application No. 16161761.
Biswas et al., "Depth Camera Based Indoor Mobile Robot Localization and Navigation", IEEE International Conference on Robotics and Automation, May 14, 2012.
Skoda et al., "Camera-Based Localization and Stabilization of a Flying Drone", Proceedings of the Twenty-Eighth International Florida Artificial Intelligence Research Society Conference, Apr. 6, 2015.

* cited by examiner

METHOD AND SYSTEM FOR A CONSTRUCTION SITE MANAGEMENT AND SUPPORT SYSTEM WITH A MARKING ROBOT

FIELD OF THE INVENTION

The present invention relates generally to a method for an automated construction site management and support system for a preparation of a construction site during a construction rest period, to an automated construction site management and support system, and to a computer program product.

BACKGROUND

In the art of general construction work such as building construction, civil engineering and in flexible factory environments for the production of consumer goods, planning, progress observation, documentation, and appropriate accounting are important key factors. In many instances, those aspects are getting more and more complex and dynamic, in particular due to the many parties involved, fluctuating human and/or objective resources, increased complexity of the end results, tighter schedules, increased costs of human resources, etc. Work that was formerly planed and overseen by a single manager is nowadays too complex for a single person and a splitting between multiple people often miscarries at the thereby uprising interfaces.

It is therefore tried to expand automation and computerization in this technical field. For example, in the art of building construction EP 2 629 210, JP 5489310, CN 103886139, US 2014/268064 or US 2014/192159 are giving examples of so called BIM-System approaches. Or in another example from the art of assembly line factory environments, EP 1 116 080 or alike relate to a management of automated tools.

The technical problems therewith are multifarious. For example: Paper based orders might be outdated by the time they are issued to the executing entity; An immediate response to and purposeful handling of the unexpected is required, wherein all the consequences to a desired schedule have to be considered to minimize impact; A detecting, handling and documenting of the done work has to be established, deviations from a planed schedule have to be documented, determined and handled. Therein, the existing dependencies are often too complex to immediately scope with, in particular for an on-site executing entity.

Particularly in view of the desired flexible and efficient usage of executing entities, in view of the demand for increased efficiency and tight schedules, or often practiced real time replacement and spare management of structural and human resources, improvements going further than the standard human usage of computer and mobile phones are demanded.

In particular, a human worker, as the on-site executing entity, is demanded to consider above mentioned problems and pitfalls, whereas his main task would actually be to getting his work done. Furthermore, with the constructional tasks becoming more and more complex and at the same time having a demand for increased efficiency to meet tight schedules the risk for an increased error rate grows.

In a general construction work often a specific sequential sequence of work packages needs to be followed, wherein subsequent work packages might need to be postponed until a specific prerequisite step is done, particularly when the execution of such a specific step requires highly specialized staff. Thus, with lacking manpower, in particular if specialized staff is lacking, a delay of a single specific construction step can stop a complete sequence of work packages.

SUMMARY

Therefore, it is particularly desirable to relieve the workload on specialized staff, on the one hand by automating as many of the specialized steps, the steps often involving planning and tagging constructional markings and verifying construction tolerances, or on the other hand by providing means to facilitate such complex construction steps so that they can be executed by less skilled personnel.

Some embodiments of the present invention improve planning and coordination of work packages on a construction site and thus to increase the efficiency to accomplish a construction project.

Some embodiments technically aid the on-site executing entity in getting his work done, in particular in a way being efficient from an overall project view without needing to have all the knowledge of the overall desired result and coherences of the schedules.

Some embodiments improve the quality of constructional work, particularly by minimizing the error rate, in particular by preventing errors caused by human workers being subject of a tight schedule.

Some embodiments improve human resource management, in particular by minimizing the dependence on specialized staff.

The invention relates to a method for an automated construction site management and support system for a preparation of a construction site during a construction rest period, with
  at least one server means, storing a general construction database, the database comprising
    structured datasets of a plurality of object entities of physical construction components, in particular wherein the datasets comprise digital construction plan information (e.g. 2D or 3D information, CAD information) and attribute information of the object entities,
    a hierarchical structure of the object entities representing a desired construction result to be established by the physical construction components, and
    structured datasets of resource entities, in particular wherein the datasets comprise information about manpower reserve and material reserve,
  a mobile support system being adapted for
    automatic movement and positioning on the construction site, and
    tagging construction markings and information, in the following called tags, to the construction site, to that end, the mobile support system comprising means for tagging construction markings and information, particularly at least one of a spattering device, a laser torch, and a multifunctional articulated arm.

The object entity might represent a single physical construction component, e.g. such as a single wall, a pillar, or a power plug, or it might represent a coherent set of physical construction components, e.g. such as a walling of a single room or multiple rooms, or a laying of a cable network for parts of the construction site. Depending of the type and complexity of an object entity the database might comprise 2D or 3D construction plan information, e.g. such as CAD information, network plans, information on special construction requirements, e.g. such as ambient conditions, special tools to be used, or a dependency on other object entities, and security relevant information, particularly for a human worker. Furthermore, the construction database is continuously updated with new information, e.g. such as a current "as-built" information for the construction site comprising execution state information for individual object entities, problems that may have occurred, e.g. such as delays or damage of object entities. The database further comprises information about human resources and material reserve, in particular wherein the human resource information comprises information about availability and qualification of a human worker, e.g. a work schedule and a list of tasks that can be adopted by the worker.

For automated movement and orientation on the construction site the mobile support system might be provided with specific information for target location stored on the construction database. For example, this might include GPS coordinates, 3D coordinates of an internal construction site coordinate system, 3D building information comprising obstacles, stairways etc., or information for guided movement, e.g. by means of a laser guidance system. In addition, the mobile support system might be equipped with its own orientation and guidance system, e.g. comprising a camera based localization system, in particular for avoiding obstacles on the way to the target location and for local orientation at the target location.

In particular, the mobile support system might be a ground based robotic vehicle or a flying robotic vehicle (UAV).

The method according to the invention is characterized by the following steps:
- a sequence of work packages for the construction of object entities being automatically defined based on the current state of the construction database, particularly by optimizing the disposal of available manpower and material reserve,
- at least one auxiliary preparatory task being automatically determined based on the sequence of work packages for the construction of object entities,
- the at least one auxiliary preparatory task being automatically assigned to the mobile support system, and
- the mobile support system automatically tagging markings and information to the construction site for supporting the sequence of work packages based on the assigned auxiliary preparatory task.

Therefore, the working hours of an executing entity, particularly of a human worker, will be used in a most efficient way by automating much of the preparatory work for the executing entity such as planning the next working steps and tagging corresponding construction markings. In particular, the planning and tagging can be executed automatically in the rest time of an executing entity, e.g. during the night, and thus enables an around-the-clock operation of a construction project without increasing human resources. Furthermore, planning of sequences of construction steps and tagging constructional markings often requires skilled staff and thus often represents a bottleneck in a sequence of work packages. The method according to the invention lightens the burden on skilled personnel and thus prevents emerging delays caused by too many of such bottlenecks and reduces idle time of less skilled human workers and machine devices.

In a further embodiment, the tags of the mobile support system comprise information about a designation of the work package to an executing entity, the executing entity particularly being at least one of a human worker and an automated or semi-automated tool.

Therefore, when arriving at the construction site, an executing entity, here particularly a human worker, can immediately identify his responsibilities and his work packages, e.g. without the need of a first instructional meeting with his superior.

In another embodiment the tags of the mobile support system comprise information or instructions about auxiliary means, particularly devices and/or materials, to be used by the executing entity for the execution of the work package, in particular positional information and a type or an identifier of the devices and/or materials.

In particular on large construction sites, this embodiment makes sure that the tools and devices, as well as the materials are used in a most efficient manner. Particularly in cases of human resource fluctuations, also a replacement worker immediately knows where to find the required tools and materials to fulfil his task. For high-maintenance devices it further ensures a well distributed degree of capacity utilization and/or an optimized maintenance schedule.

A particular embodiment relates to a method where the tags of the mobile support system comprise constructional instructions for the executing entity, in particular a sequential or chronological order for constructional steps of the work package. Again this embodiment is advantageous in case of fluctuating human resources and provides the possibility that also less skilled personnel can execute a work package that usually requires a specialist.

For example, such constructional instruction markings may represent guiding information to be read by a human worker or they may also represent guiding points for an automated or semi-automated executing device. For example the markings may comprise a machine readable code with further instructions for such a machine, e.g. a color or a sequence of colors to be used by an automated painting machine or the diameter of boreholes to be drilled by an automated drilling machine.

In view of work packages that are potentially dangerous for a human worker or in case of sensitive construction steps, e.g. regarding special requirements for the accuracy and small tolerance levels, in another embodiment the tags of the mobile support system comprise cautionary notes about the work package, in particular security warnings for specific steps of the work package and/or safety precautions for the executing entity, particularly a human worker.

The tags of the mobile support system may be based on at least one of a 2D mark, e.g. such as a painted mark, a laser burned mark, or written information, a 3D structure, e.g. by means of a layer-by-layer application of a 3D structure ("3D printing"), e.g. by a surface spattering device, or by attaching a physical structure to the construction site, e.g. by a multifunctional articulated arm as for example known in many industrial applications, the 3D structure particularly being a framework delimiter or a physical stopper for a tool, an electronically readable tag, in particular by means of attaching an RFID tag, and an optical tag, for example a reflector for a measuring work package.

For example, for applying a 2D mark or a 3D structure a generic surface spattering device as described in EP 11 760 473, EP 13 166 334, and EP 12 160 353 might be used.

Often monitoring of the ambient conditions on a construction site is important and dedicated monitoring tools and devices are used and the information is sent to the construction database. For example, in many cases a specific constructional step might depend on ambient conditions such as a certain temperature or humidity level, or planning of subsequent work packages might require some drying time. Monitoring devices can be stationary and/or they are dynamically moved on the construction site according to the actual needs.

Therefore, in another embodiment the mobile support system is adapted for measuring ambient conditions on the construction site, in particular temperature and humidity conditions, and for automatically providing the ambient information to the construction database, in particular wherein the information is used for updating the sequence of work packages, particularly for verifying or cancelling a work package where the constructional steps depend on ambient conditions.

For example an online bidirectional communication link, particularly a real time link, might be established by communication interfaces of the mobile support system and the server means. Therein, the mobile support system might be built to provide the specific on-site task information and to establish a dynamic and real time updating of the construction database and the specific on-site task.

In a further embodiment the mobile support system might also provide further information for updating the construction database. For example, the mobile support system might be adapted for taking a set of control measurements on the construction site for determining progress information for a previously executed work package, the progress information particularly comprising at least one of a quantitative indication on the execution state of a defined work step of the previously executed work package and a qualitative indication on an executed work step, in particular an indication relating to an overstepping of a defined threshold, and for automatically providing the progress information to the construction database. The set of control measurements are assigned to the mobile support system as part of the auxiliary preparatory task based on the current state of the construction database, in particular wherein the mobile support system being adapted for providing measurements for at least one of  camera based referencing, in particular for automatic feature recognition comprising recognition of at least one of a spatial point, an edge, and a corner,  an image classification algorithm, particularly based on geometric and semantic classification, and  a point cloud classification algorithm, particularly based on geometric and semantic classification.

For such a control measurement many different kinds of generic surveying methods and devices are known, e.g. for measuring spatial points, edges, distances, and/or acquiring 2D or 3D point clouds of an area, and adapted for being used with a combination of different image processing and feature extraction algorithms. For example a building surveying device for measuring and marking spatial points in the course of construction is described by EP 2 458 328. A further construction surveying device for measuring and marking spatial points along a horizontal line on an arbitrarily shaped surface is described by EP 2 638 358. Another structure measuring unit for tracking, measuring and marking edges and corners of adjacent surfaces is described by EP 2 541 194.

The invention further relates to an automated construction site management and support system for a preparation of a construction site during a construction rest period, with  computation means comprising at least one server means,
  storing a general construction database, the database comprising
   structured datasets of a plurality of object entities of physical construction components, in particular wherein the datasets comprise digital construction plan information (e.g. 2D or 3D information, CAD information) and attribute information of the object entities,
   a hierarchical structure of the object entities representing a desired construction result to be established by the physical construction components, and
   structured datasets of resource entities, in particular wherein the datasets comprise information about manpower reserve and material reserve,
 a mobile support system being adapted for
  automatic movement and positioning on the construction site, and
  tagging construction markings and information, in the following called tags, to the construction site, to that end, the mobile support system comprising means for tagging construction markings and information, particularly at least one of a spattering device, a laser torch, and a multifunctional articulated arm.

The system is characterized in that:
the computation means automatically defining a sequence of work package for the construction of object entities based on the current state of the construction database, particularly by optimizing the disposal of available manpower and material reserve,
the computation means automatically determining at least one auxiliary preparatory task based on the sequence of work packages for the construction of object entities,
the computation means automatically assigning the at least one auxiliary preparatory task to the mobile support system, and
the computation means causing the mobile support system to automatically tag markings and information to the construction site for supporting the sequence of work packages based on the assigned auxiliary preparatory task.

In a particular embodiment the mobile support system is adapted for providing tags based on at least one of a 2D mark, e.g. such as a painted mark, a laser burned mark, or written information, a 3D structure, e.g. by means of a layer-by-layer application of a 3D structure ("3D printing"), e.g. by a surface spattering device, or by attaching a physical structure to the construction site, e.g. by a multifunctional articulated arm as for example known in many industrial applications, the 3D structure particularly being a framework delimiter or a physical stopper for a tool, an electronically readable tag, in particular by means of attaching an RFID tag, and an optical tag, for example a reflector for a measuring work package.

In a further embodiment of the construction site management and support system, the mobile support system is adapted for providing tags comprising information about a designation of the work package to an executing entity, the executing entity particularly being at least one of a human worker and an automated or semi-automated tool.

In another embodiment of the construction site management and support system the mobile support system is adapted for providing tags comprising information or instructions about auxiliary means, particularly devices and/or materials, to be used by the executing entity for the execution of the work package, in particular positional information and a type or an identifier of the devices and/or materials.

A particular embodiment relates to a construction site management and support system where the mobile support system is adapted for providing tags comprising constructional instructions for the executing entity, in particular a sequential or chronological order for constructional steps of the work package.

In another embodiment of the construction site management and support system the mobile support system is adapted for providing tags comprising cautionary notes about the work package, in particular security warnings for specific steps of the work package and/or safety precautions for the executing entity, particularly a human worker.

In another embodiment the mobile support system is adapted for measuring ambient conditions on the construction site, in particular temperature and humidity conditions, and for automatically providing the ambient information to the construction database, in particular wherein the information is used for updating the sequence of work packages, particularly for verifying or cancelling a work package where the constructional steps depend on ambient conditions.

In a particular embodiment the construction site management and support system comprises a mobile client device for an executing entity with a variable place of action, in particular a human worker or an automated or semi-automated tool, adapted for establishing a communication link to the server means, wherein the executing entity updates the construction database by means of the mobile client device with information about an executed work package for an object entity for establishing a current state of the construction database.

In a further embodiment the mobile support system is adapted for taking control measurements on the construction site for determining progress information for a previously executed work package, the progress information particularly comprising at least one of a quantitative indication on the execution state of a defined work step of the previously executed work package and a qualitative indication on an executed work step, in particular an indication relating to an overstepping of a defined threshold, and for automatically providing the progress information to the construction database. The control measurements are assigned to the mobile support system as part of the auxiliary preparatory task based on the current state of the construction database, in particular wherein the mobile support system being adapted for providing measurements for at least one of
    camera based referencing, in particular for automatic feature recognition comprising recognition of at least one of a spatial point, an edge, and a corner,
    an image classification algorithm, particularly based on geometric and semantic classification, and
    a point cloud classification algorithm, particularly based on geometric and semantic classification.

The system according to the present invention comprises microcontrollers, microcomputers, DSPs or a programmable or hardwired digital logics, wherefore the present invention might involve a computer program product that is stored on a machine readable medium or being embodied as electromagnetic wave (such as e.g. a wired or wireless data signal), which implements functionality according to the invention in software—which therefore is also an embodiment of the invention.

In particular, the program code can be carried out on a digital computation unit of the server or a mobile client device of a system as presented herein.

The computer program product for an automated construction site management and support system according to the invention comprises program code being stored on the server means or the client device, and being configured for automatically communicating with the construction database for retrieving the current state of the construction database, which is used for executing a defined algorithm for determining new hierarchical sequences of work packages to be established for a desired construction result and for providing corresponding construction and/or support information, in particular wherein the algorithm optimizes the disposal of available manpower and material reserve, wherein the information is assigned to the mobile support system.

The present invention further relates to a method for an automated construction site management and support system for determining a current state of a construction site during a construction rest period, with
    at least one server means, storing a general construction database, the database comprising
        structured datasets of a plurality of object entities of physical construction components, in particular wherein the datasets comprise digital construction plan information (e.g. 2D or 3D information, CAD information) and attribute information of the object entities,
        a hierarchical structure of the object entities representing a desired construction result to be established by the physical construction components, and
        an as-built model for the construction site comprising execution state information for the object entities,
    a mobile support system being adapted for
        automatic movement and positioning on the construction site, and
        executing controlling tasks on the construction site for determining a current state of an object entity, to that end, the mobile support system comprising sensor means for acquiring test data, particularly at least one of a camera and a laser distance meter.

For example, the as-built model might comprise at least one of quantitative information on the execution state of defined work steps of previously executed work packages on the object entities, e.g. such as a checklist for planned and executed work steps, and qualitative information on executed work steps, in particular indications relating to an overstepping of defined thresholds. To that end, the mobile support system might be adapted for providing measurements for at least one of
    camera based referencing, in particular for automatic feature recognition comprising recognition of at least one of a spatial point, an edge, and a corner,
    an image classification algorithm, particularly based on geometric and semantic classification, and
    a point cloud classification algorithm, particularly based on geometric and semantic classification.

For such a control measurement many different kinds of generic surveying methods and devices are known, e.g. for measuring spatial points, edges, distances, and/or acquiring 2D or 3D point clouds of an area, and adapted for being used with a combination of different image processing and feature extraction algorithms. For example a building surveying device for measuring and marking spatial points in the course of construction is described by EP 2 458 328. A further construction surveying device for measuring and marking spatial points along a horizontal line on an arbitrarily shaped surface is described by EP 2 638 358. Another structure measuring unit for tracking, measuring and marking edges and corners of adjacent surfaces is described by EP 2 541 194.

The method according to the invention is characterized by the following steps:
- a sequence of previously executed work packages for the construction of object entities being stored on the construction database,
- at least one controlling task for at least one of the previously executed work packages being automatically defined, based on the current state of the construction database and a defined outcome for the previous work package,
- the at least one controlling task being automatically assigned to the mobile support system,
- the mobile support system automatically executing the controlling task on the construction site for determining a progress information for the previously executed work package, the progress information comprising at least one of a quantitative indication on the execution state of a defined work step of the work package and a qualitative indication on an executed work step, in particular an indication relating to an overstepping of a defined threshold, and
- the mobile support system being adapted for automatically providing the progress information to the construction database for establishing an updated current state of the construction database, in particular for updating the as-built model of the construction site.

In particular, the mobile support system might be a ground based robotic vehicle or a flying robotic vehicle (UAV).

The sequence of previously executed work packages might be provided directly by input by an executing entity, e.g. by means of a human worker or an automated or semi-automated tool, wherein the executing entity updates the construction database by means of a mobile client device with information about an executed work package for an object entity for establishing a current state of the construction database. The input by the executing entity might also include information about the desired outcome of the work package, e.g. defined tolerance levels for particular construction parts, as well as instructions to test the outcome, the instructions being assigned to the mobile support system. On the other hand, the system might automatically recognize the completion of a work package, e.g. based on the as-built model and update information on single work steps, and information about the defined outcome of a work package might also be stored on the construction database, e.g. based on a construction model with construction tolerances for different object entities, wherein required test measurements are then automatically determined and assigned to the mobile support system for verifying whether the executed work step fulfils the requirements.

In a particular embodiment the controlling task for determining the current state of the previously executed work package for an object entity comprises acquisition of test data, the test data comprising at least one of
- defined images of parts of the construction site representing the object entity,
- defined multiple images for stereoscopic image processing of parts of the construction site representing the object entity, in particular for creating a 3D point cloud,
- defined range measurement data of parts of the construction site representing the object entity for creating a 3D point cloud of parts of the construction site representing the object entity,
- defined range measurement data of parts of the construction site representing the object entity for applying an automatic edge tracking algorithm on parts of the construction site representing the object entity,
- measurement data of ambient conditions, in particular temperature and humidity conditions, and
- identification data for auxiliary means, particularly devices and material stock, in particular by means of electronic or visual markers on the material, in particular wherein the test data is made available to the construction database.

The test data might be used for monitoring purposes, e.g. 2D or 3D images for inspection by a construction site manager, and/or for manual or automatic processing and analysis, e.g. such as automatic feature recognition based on geometric and/or semantic classification models and automatic control algorithms for checking tolerance levels. Based on the data, automatic warnings might be generated for a construction site manager, e.g. in case when tolerance levels are not met or when the construction of an object entity is out of schedule.

The invention further relates to an automated construction site management and support system for determining a current state of a construction site during a construction rest period, with
- computation means comprising at least one server means, storing a general construction database, the database comprising
  - structured datasets of a plurality of object entities of physical construction components, in particular wherein the datasets comprise digital construction plan information (e.g. 2D or 3D information, CAD information) and attribute information of the object entities,
  - a hierarchical structure of the object entities representing a desired construction result to be established by the physical construction components, and
  - an as-built model for the construction site comprising execution state information for the object entities,
- a mobile support system being adapted for
  - automatic movement and positioning on the construction site, and
  - executing controlling tasks on the construction site for determining a current state of an object entity, to that end, the mobile support system comprising sensor means for acquiring test data, particularly at least one of a camera and a laser distance meter.

The system is characterized in that:
- a sequence of previously executed work packages for the construction of object entities being stored on the construction database,
- the computation means automatically defining at least one controlling task for at least one of the previously executed work packages, based on the current state of the construction database and a defined outcome for the previous work package,
- the computation means automatically assigning the at least one controlling task to the mobile support system,
- the computation means causing the mobile support system to automatically execute the controlling task on the construction site for determining a progress information for the previously executed work package, the progress information comprising at least one of a quantitative indication on the execution state of a defined work step of the work package and a qualitative indication on an executed work step, in particular an indication relating to an overstepping of a defined threshold, and
- the mobile support system being adapted for automatically providing the progress information to the construction database for establishing an updated current state of the construction database, in particular for updating the as-built model of the construction site.

In a particular embodiment the mobile support system is adapted for acquiring test data comprising at least one of
- defined images of parts of the construction site representing the object entity,
- defined multiple images for stereoscopic image processing of parts of the construction site representing the object entity, in particular for creating a 3D point cloud,
- defined range measurement data of parts of the construction site representing the object entity for creating a 3D point cloud of parts of the construction site representing the object entity,
- defined range measurement data of parts of the construction site representing the object entity for applying an automatic edge tracking algorithm on parts of the construction site representing the object entity,
- measurement data of ambient conditions, in particular temperature and humidity conditions, and
- identification data for auxiliary means, particularly devices and material stock, in particular by means of electronic or visual markers on the material, in particular wherein the mobile support system is adapted for making the test data available to the construction database.

The invention also relates to a computer program product for an automated construction site management and support system for determining a current state of a construction site during a construction rest period to be used within a method according to the invention, wherein the computer program product being stored on the server means or a client device, particularly being part of an automated construction site management and support system according to the invention. The computer program product comprises program code being configured for automatically communicating with the construction database for retrieving the current state of the construction database, which is used for executing a defined algorithm for determining a controlling task for a previously executed work package to be established for a desired construction result and for providing corresponding construction and/or support information, wherein the information being assigned to the mobile support system.

BRIEF DESCRIPTION OF THE DRAWINGS

Devices, methods, setups and computer programs according to the invention are described or explained in more detail below, purely by way of example, with reference to working examples shown schematically in the drawing. Specifically, FIG. 1a,b: an exemplary application for the inventive method and system.

The diagrams of the figures should not be considered as being drawn to scale. Where appropriate, the same reference signs are used for the same features or for features with similar functionalities.

DETAILED DESCRIPTION

Figure 1A:
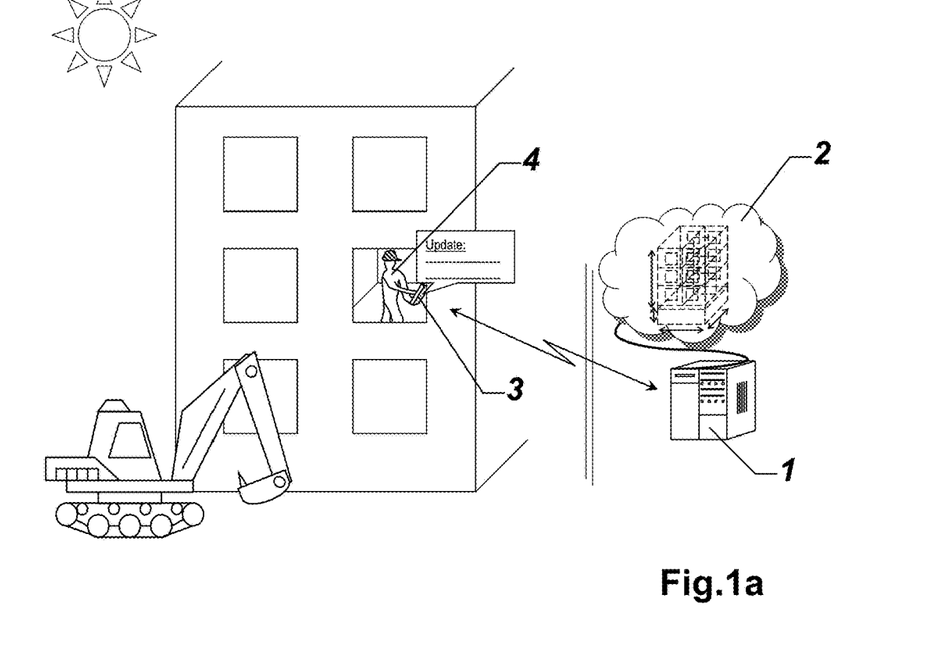
Figure 1B:
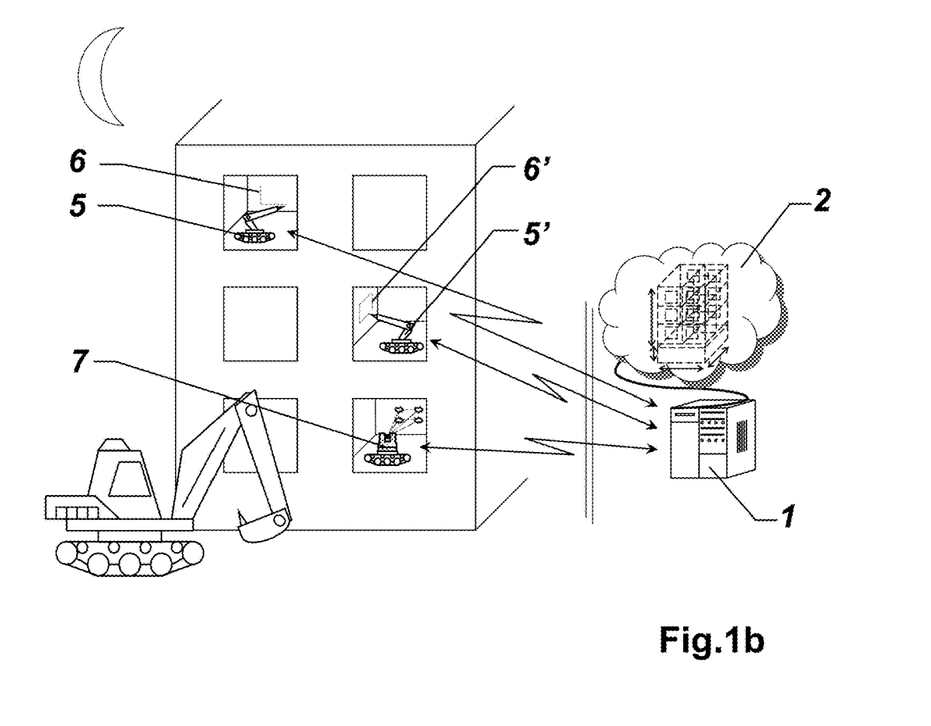

FIG. 1 shows an exemplary application for the inventive method, here in the field of building construction, and a management and support system according to the invention. The system comprises a server means 1, storing a general construction database 2, the database comprising structured datasets of a plurality of object entities of physical construction components, in particular wherein the datasets comprise digital construction plan information (e.g. 2D or 3D information, or CAD information) and attribute information of the object entities, a hierarchical structure of the object entities representing a desired construction result to be established by the physical construction components, and structured datasets of resource entities, in particular wherein the datasets comprise information about manpower reserve and material reserve. The database may further comprise an as-built model with quantitative information on the execution state of defined work steps of previously executed work packages for the object entities, e.g. such as a checklist for planned and executed work steps, and qualitative information on executed work steps, in particular indications relating to an overstepping of defined thresholds. Here, the system further comprises a mobile client device 3 for an executing entity 4 with a variable place of action, in particular for a human worker or an automated or semi-automated tool, adapted for establishing a communication link to the server means 1.

As indicated in FIG. 1a, after finishing a work package and/or by the end of a working period, the executing entity 4 updates the construction database 2 with current information about the state of the object entity by means of the mobile client device 3. Based on the current state of the construction database 2, a next sequence of work packages for the construction of object entities is automatically defined, e.g. by a software implemented algorithm stored on the server means 1, particularly by optimizing the disposal of available manpower and material reserve.

During a rest period, as indicated in FIG. 1b, here during the night, based on the new sequence of work packages a sequence of auxiliary preparatory tasks is assigned to a mobile support system 5 being adapted for automatic movement and positioning on the construction site, and for tagging construction markings and information 6,6' to the construction site for supporting the construction of the object entities according to the assigned sequence of auxiliary preparatory tasks. The mobile support system might be a ground based robotic vehicle or a flying robotic vehicle (UAV) and the markings might be based on at least one of a 2D marking, e.g. a painted marking, a laser burned marking, or written information, a 3D structure, e.g. by a surface spattering device or by attaching a framework delimiter or a physical stopper for a tool, e.g. by means of a multifunctional articulated arm, an electronically readable tag, e.g. such as attaching an RFID tag containing additional constructional information for a human worker or an automated or semi-automated tool, and optical markings, e.g. reflectors for a measurement work package by means of a laser range measurement.

The mobile support system might also be used for automatically executing controlling tasks for determining and verifying a progress or state of a previous work package. For example a specific mobile support system 7 might be deployed solely for taking control measurements to verify the progress of a previous work package, wherein the mobile support system establishes a communication link to the server means 1 and updates the construction database 2 with current progress information. The progress information might comprise a quantitative indication on the execution state of a defined work step of the work package, e.g. such as a checklist of work steps, and/or a qualitative indication on an executed work step, in particular an indication relating to an overstepping of a defined threshold.

Therefore, the amount of work for updating of the database 2 by a human worker is greatly reduced. Furthermore, the controlling tasks may also include quality control measurements, e.g. taking control measurements for verifying tolerances, and thus provide a valuable tool for quality control management of the construction site. Of course, by way of example, the mobile support system might also be adapted both for taking control measurements and for tagging markings at the same time, i.e. in one go.

For automated movement and orientation on the construction site the mobile support system 5,5',7 is provided with specific location and orientation information stored on the construction database. For example, this might include GPS coordinates, 3D coordinates of an internal construction site coordinate system, 3D building information comprising obstacles, stairways etc., or information for guided movement, e.g. by means of a laser guidance system. In addition, the mobile support system 5,5',7 might be equipped with its own orientation and guidance system, e.g. comprising a camera based localization system, in particular for avoiding obstacles on the way to the tagging and measuring location and for local orientation for executing the preparatory and controlling tasks.

Therefore, with a system according to the invention the working hours of an executing entity 4, particularly of a human worker, will be used in a most efficient way by automating much of the preparatory and controlling work for the executing entity 4 such as planning the next working steps, tagging corresponding construction markings 6,6', and keeping track of the current state of the construction site. In particular, since the planning, tagging, and controlling can be executed automatically in the rest time of an executing entity 4, e.g. during the night, an around-the-clock operation of a construction project is possible without increasing human resources. Furthermore, planning of sequences of construction steps and tagging constructional markings 6,6', as well as quality control often requires skilled staff and thus often represents a bottleneck in a sequence of work packages. The method according to the invention lightens the burden on skilled personnel and thus prevents emerging delays caused by too many of such bottlenecks.

Figure 2:
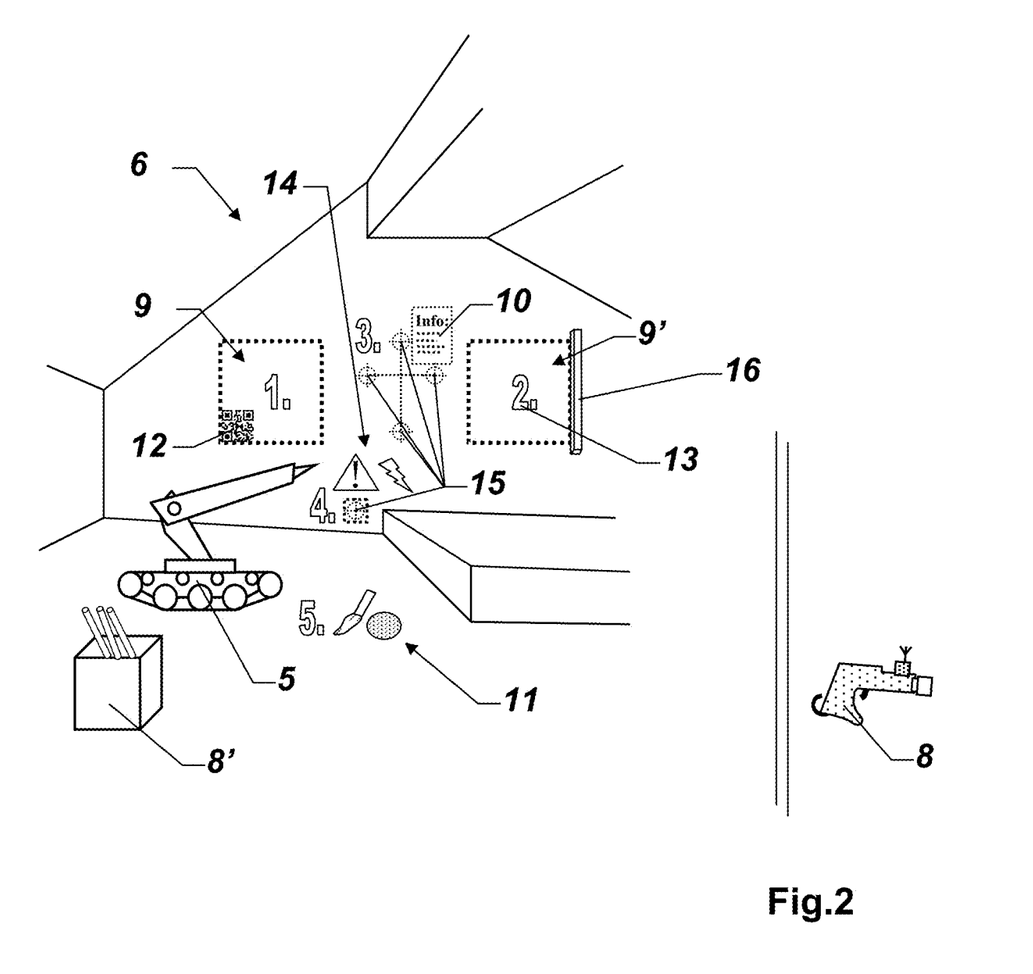
FIG. 2: exemplary markings and information provided by the mobile support system according to the invention.

FIG. 2 shows some examples of exemplary markings and information 6 provided by the mobile support system 5 according to the invention. Here, constructional markings for the construction of two windows 9,9', some boreholes 15, and for painting the floor are given. Furthermore, a physical stopper for a tool 16 is placed for supporting positioning of the tool, e.g. for stabilizing a buzz saw for cutting the window frame. Additional information about the construction and the work package is given as human readable instructions 10 or as code instructions, particularly by pictograms 11, e.g. indicating painting of the floor with a corresponding color, or by machine readable codes 12, e.g. representing guiding points or specific settings for an automated or semi-automated executing device.

In particular, the provided information further comprises a designation of the work package to an executing entity 4, the executing entity particularly being a human worker or an automated or semi-automated tool. Therefore, when arriving at the construction site, an executing entity 4, here particularly a human worker, can immediately identify his responsibilities and his work packages, e.g. without the need of a first instructional meeting with his superior.

The information provided by the tags of the mobile support system 10,11,12,13,14 might also comprise information or instructions about auxiliary means such as specific devices 8 and/or materials 8' to be used by the executing entity 4 for the constructional task of the work package, in particular positional information for the devices 8 and/or materials 8' and a type or an identifier of the devices 8 and/or materials 8'. In particular on large construction sites, this makes sure that the tools and devices, as well as the materials are used in a most efficient manner. Particularly in cases of human resource fluctuations, also a replacement worker immediately knows where to find the required tools and materials to fulfil his task. For high-maintenance devices it further ensures a well distributed degree of capacity utilization and/or an optimized maintenance schedule.

The tags may further comprise constructional instructions for the executing entity 4, in particular a sequential or chronological order 13 for constructional steps of the work package. Again this is for example advantageous in case of fluctuating human resources and provides the possibility that also less skilled personnel can execute a work package that usually requires a specialist.

In view of work packages that are potentially dangerous for a human worker or in case of sensitive construction steps, e.g. regarding special requirements for the accuracy and small tolerance levels, the tags may comprise cautionary notes 14 about the work package, in particular security warnings for specific steps of the work package and/or safety precautions for the executing entity 4, particularly human workers. For example, one of the boreholes 15 in the figure might be close to a high-voltage wire, which is indicated by a cautionary note 14.

The tags may comprise at least one of a 2D mark, e.g. such as a painted mark, a laser burned mark, or written information, a 3D structure, e.g. by means of a layer-by-layer application of a 3D structure ("3D printing"), e.g. by a surface spattering device, or by attaching a framework delimiter or a physical stopper for a tool, an electronically readable tag, in particular by means of attaching an RFID tag, and an optical tag, for example a reflector for a measuring work package.

Figure 3:
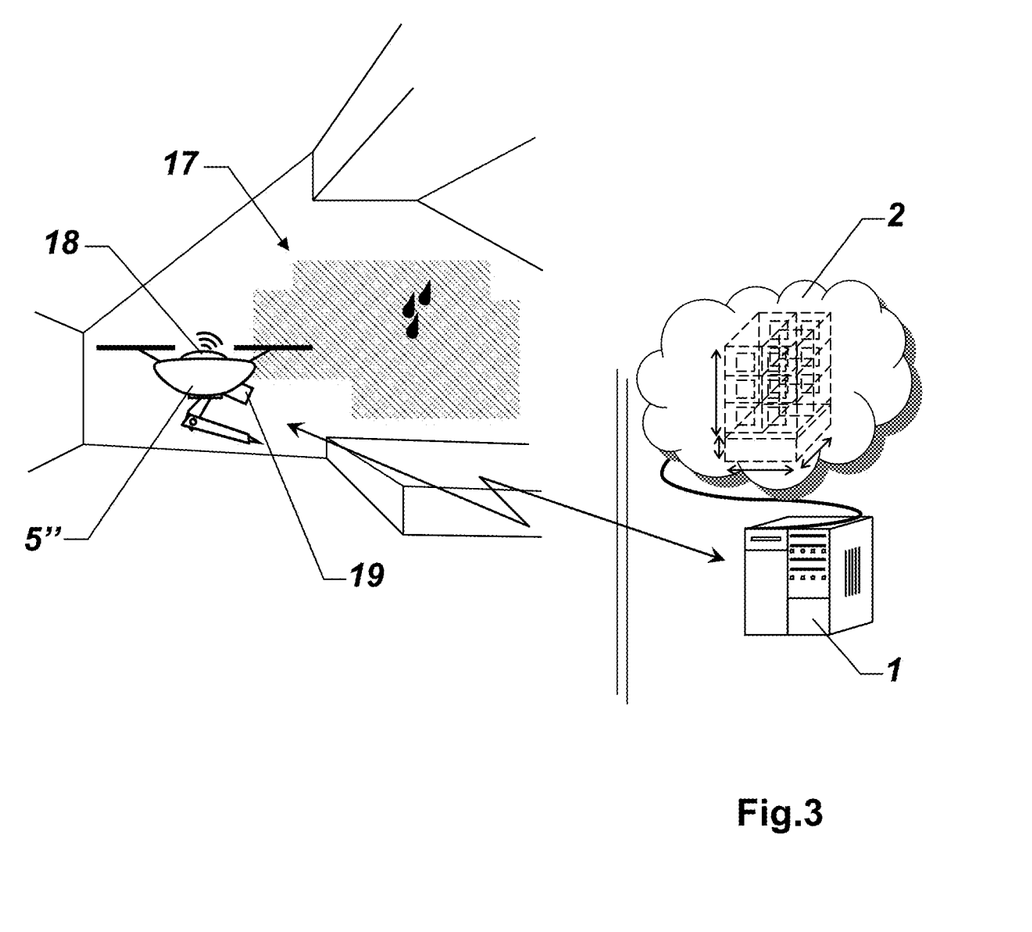
FIG. 3: another embodiment with the mobile support system being built as a UAV and being adapted for measuring ambient conditions.

FIG. 3 shows an embodiment wherein the mobile support system 5" is embodied as a UAV which is also used for monitoring of the ambient conditions, here by means of a temperature and humidity detector 19. For example, in many cases a specific constructional step might depend on ambient conditions such as a certain temperature or humidity level, or planning of subsequent work packages might require some drying time, e.g. a freshly painted wall before painting a second layer of paint. Monitoring devices can be stationary and/or they are dynamically moved on the construction site according to the actual needs. Therefore, one possibility is to also use the automated mobile support system 5" for dynamically monitoring the conditions on different places on the construction site, e.g. for automatically providing the ambient information to the construction database 2, in particular wherein the information is used for updating the sequence of work packages, particularly for verifying or cancelling of a work package where the constructional steps depend on ambient conditions.

For example the system establishes an online, particularly real time, bidirectional communication link by communication interfaces 18 of the mobile support system 5" and the server means 1. The mobile support system 5" is therein built to provide the specific on-site preparatory task information and to establish a dynamic and real time updating of the construction database 2 and the specific on-site task.

Figure 4:
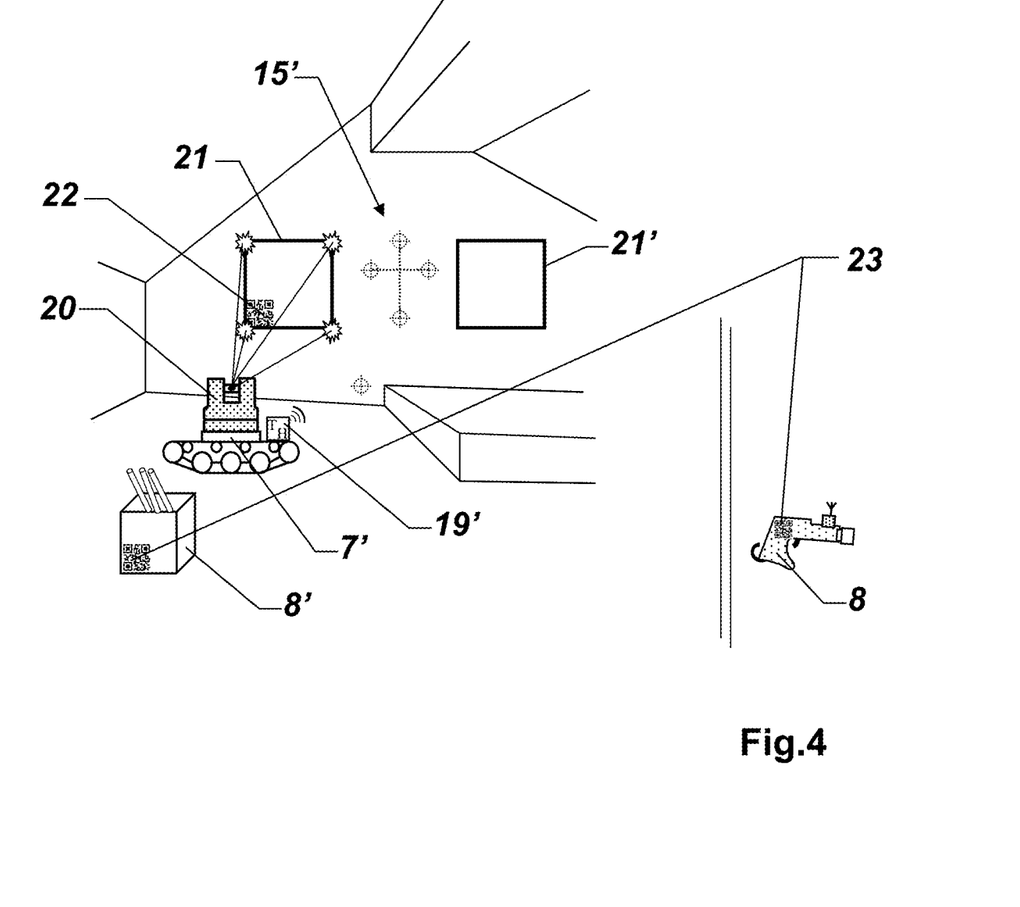
FIG. 4: another embodiment with the mobile support system being adapted for determining a current state of an object entity on a construction site.

FIG. 4 shows an embodiment wherein a mobile support system 7' is specifically adapted for solely executing control tasks for determining the progress and/or the state of a previously executed work package on an object entity on the construction site. Here, the mobile support system 7' comprises a temperature and humidity detector 19' and a generic laser based surveying device 20 for measuring spatial points on an arbitrarily shaped surface and for measuring edges and corners of adjacent surfaces. Thus, by means of a bidirectional communication link between the mobile support system 7' and the server means, the mobile support system 7' dynamically updates the construction database with progress and control information, in particular wherein the information is used for updating the sequence of work packages.

In the given example the mobile support system 7' checks the state and quality of recently built window frames 21,21' by means of a generic laser based surveying device 20 and further recognizes that some planned boreholes 15' are still missing. Furthermore, machine readable tags 22 might be placed at the construction site, e.g. electronic tags such as RFID tags, barcode marks, or optical identifier tags, supporting local orientation and localization of the mobile support system and/or comprising additional information for the mobile support system for executing a specific task.

The system further collects current information about available auxiliary means such as specific devices 8 and/or materials 8', in particular by means of electronic or visual identifiers (i.e. machine readable identifiers) 23 attached to the auxiliary means 8,8'.

What is claimed is:

1. A method for an automated construction site management and support system for a preparation of a construction site during a construction rest period, with at least one server storing a general construction database comprising structured datasets of a plurality of object entities of physical construction components, a hierarchical structure of the object entities representing a desired construction result to be established by the physical construction components, and structured datasets of resource entities, a mobile support system being a robotic vehicle adapted for automatic movement and positioning on the construction site, and tagging construction tags consisting of markings and information to the construction site, the method comprising:
   automatically, by the at least one server, defining a sequence of work packages for the construction of object entities based on the current state of the construction database;
   automatically, by the at least one server, determining at least one auxiliary preparatory task based on the sequence of work packages for the construction of object entities, the at least one auxiliary preparatory task being automatically assigned to the mobile support system; and
   the mobile support system:
      automatically tagging markings and information to the construction site for supporting the sequence of work packages based on the assigned auxiliary preparatory task by the mobile support system,
      taking a control measurement on the construction site for determining progress information for a previously executed work package, the progress information particularly comprising at least one of a quantitative indication on the execution state of a defined work step of the previously executed work package and a qualitative indication on an executed work step, and
      automatically providing the progress information to the construction database,
   wherein the control measurement is assigned to the mobile support system as part of the auxiliary preparatory task based on the current state of the construction database.

2. The method according to claim 1, wherein the tags of the mobile support system are based on at least one of:
   a 2D mark,
   a 3D structure,
   an electronically readable tag, and
   an optical tag.

3. The method according to claim 1, wherein the mobile support system is further configured to measure ambient conditions on the construction site, and automatically provide ambient information related to the ambient conditions to the construction database.

4. An automated construction site management and support system for a preparation of a construction site during a construction rest period, the system comprising:
   a computation means comprising at least one server means;
   a general construction database comprising:
      structured datasets of a plurality of object entities of physical construction components,
      a hierarchical structure of the object entities representing a desired construction result to be established by the physical construction components, and
      structured datasets of resource entities
   a mobile support system being a robotic vehicle that is configured for automatic movement and positioning on the construction site, and including a tagging construction means for generating tags consisting of markings and information to the construction site,
   wherein the computation means automatically defines a sequence of work packages for the construction of object entities based on the current state of the construction database,
   wherein the computation means automatically determines at least one auxiliary preparatory task based on the sequence of work packages for the construction of object entities,
   wherein the computation means automatically assigns the at least one auxiliary preparatory task to the mobile support system, and
   wherein the computation means causes the mobile support system to automatically tag markings and information to the construction site for supporting the sequence of work packages based on the assigned auxiliary preparatory task.

5. The system according to claim 4, wherein the mobile support system is adapted for providing tags consisting of one of:
   a 2D mark,
   a 3D structure, and
   an electronically readable tag.

6. The system according to claim 4, wherein the mobile support system is adapted for measuring ambient conditions on the construction site, and for automatically providing ambient information corresponding to the measured ambient conditions to the construction database.

7. The system according to claim 4, the system further comprising:
   a mobile client device for an executing entity with a variable place of action, and being adapted for establishing a communication link to the server means, and wherein the executing entity updates the construction database by means of the mobile client device with information about an executed work package for an object entity for establishing a current state of the construction database.

8. The system according to claim 4, wherein the mobile support system is configured to take a control measurement on the construction site for determining progress information for a previously executed work package, and automatically providing the progress information to the construction database, wherein the control measurement is assigned to the mobile support system as part of the auxiliary preparatory task based on the current state of the construction database.

9. A computer program product for an automated construction site management and support system to be used within a method according to claim 1, wherein the computer program product is stored on the server means or the client device, the computer program product comprising program code being configured for automatically communicating with the construction database for retrieving the current state of the construction database, which is used for executing a defined algorithm for determining new hierarchical sequences of work packages to be established for a desired construction result and for providing corresponding construction or support information, wherein the information is assigned to the mobile support system.

10. A method for an automated construction site management and support system for determining a current state of a construction site during a construction rest period, with at least one server for storing a general construction database, the database comprising structured datasets of a plurality of object entities of physical construction components, a hierarchical structure of the object entities representing a desired construction result to be established by the physical construction components, and an as-built model for the construction site comprising execution state information for the object entities, a mobile support system being a robotic vehicle that is adapted for automatic movement and positioning on the construction site, and executing controlling tasks on the construction site for determining a current state of an object entity, the mobile support system comprising a sensor for acquiring test data, the method comprising:
    storing a sequence of previously executed work packages for the construction of object entities on the construction database;
    automatically defining at least one controlling task for at least one of the previously executed work packages based on the current state of the construction database and a defined outcome for the previous work package with the at least one server,
    automatically assigning the at least one controlling task to the mobile support system with the at least one server;
    automatically executing the assigned controlling task on the construction site for determining a progress information for the previously executed work package by the mobile support system, the progress information comprising at least one of a quantitative indication on the execution state of a defined work step of the work package and a qualitative indication on an executed work step; and
    automatically providing the progress information to the construction database to establish an updated current state of the construction database using the mobile support system.

11. The method according to claim 10, wherein determining the current state of the previously executed work package for an object entity comprises acquisition of test data, the test data comprising at least one of:
    defined images of parts of the construction site representing the object entity,
    defined multiple images for stereoscopic image processing of parts of the construction site representing the object entity,
    defined range measurement data of parts of the construction site representing the object entity for creating a 3D point cloud of parts of the construction site representing the object entity,
    defined range measurement data of parts of the construction site representing the object entity for applying an automatic edge tracking algorithm on parts of the construction site representing the object entity,
    measurement data of ambient conditions, and
    identification data for auxiliary devices or auxiliary materials.

12. A computer program product for an automated construction site management and support system to be used within the method of claim 10, wherein the computer program product is stored on the server means or a client device, the computer program product comprising program code being configured for automatically communicating with the construction database for retrieving the current state of the construction database, which is used for executing a defined algorithm for determining a controlling task for a previously executed work package to be established for a desired construction result and for providing corresponding construction or support information, wherein the information is assigned to the mobile support system.

13. An automated construction site management and support system for determining a current state of a construction site during a construction rest period, the system comprising:
    a computation means comprising at least one server means;
    a general construction database, wherein the database includes:
        structured datasets of a plurality of object entities of physical construction components,
        a hierarchical structure of the object entities representing a desired construction result to be established by the physical construction components, and
        an as-built model for the construction site comprising execution state information for the object entities;
    a mobile support system being a robotic vehicle that is adapted for automatic movement and positioning on the construction site and executing controlling tasks on the construction site for determining a current state of an object entity, the mobile support system comprising a sensor means for acquiring test data,
    wherein a sequence of previously executed work packages for the construction of object entities are stored on the construction database,
    wherein the computation means automatically defines at least one controlling task for at least one of the previously executed work packages, based on the current state of the construction database and a defined outcome for the previous work package,
    wherein the computation means automatically assigns the at least one controlling task to the mobile support system,
    wherein the computation means causes the mobile support system to automatically execute the assigned controlling task on the construction site for determining a progress information for the previously executed work package, the progress information comprising at least one of a quantitative indication on the execution state of a defined work step of the work package and a qualitative indication on an executed work step, and wherein the mobile support system is adapted for automatically providing the progress information to the construction database for establishing an updated current state of the construction database.

14. The system according to claim 13, wherein the mobile support system is adapted for acquiring test data comprising at least one of defined images of parts of the construction site representing the object entity, defined multiple images for stereoscopic image processing of parts of the construction site representing the object entity, defined range measurement data of parts of the construction site representing the object entity for creating a 3D point cloud of parts of the construction site representing the object entity, defined range measurement data of parts of the construction site representing the object entity for applying an automatic edge tracking algorithm on parts of the construction site representing the object entity, measurement data of ambient conditions, and identification data for auxiliary means, particularly devices and material stock.

\* \* \* \* \*